Oct. 10, 1961  B. E. SHAW ET AL  3,003,410
ELECTRIC GRILL

Filed May 12, 1960  2 Sheets-Sheet 1

INVENTORS
BURTON E. SHAW
ROGER K. LEE JR.

BY *J. C. Chapman*

ATTORNEY

INVENTORS
BURTON E. SHAW
ROGER K. LEE JR.

BY *J. I. Chapman*
ATTORNEY

United States Patent Office 3,003,410
Patented Oct. 10, 1961

3,003,410
ELECTRIC GRILL
Burton E. Shaw, South Lynnfield, and Roger K. Lee, Jr., Watertown, Mass., assignors to Electronics Corporation of America, Cambridge, Mass., a corporation of Massachusetts
Filed May 12, 1960, Ser. No. 28,784
6 Claims. (Cl. 99—380)

This invention relates to an electric grill of the type having a stationary base heating plate and an upper heating plate movable relative to the base plate to permit insertion and removal of food to be heated between the plates.

A principal object of the invention is the provision of a grill structure which readily permits the operator to positively lock the upper plate in the separated position and to quickly unlock it for movement into the operating position.

Another object is the provision of a compact, rugged hinge and lock assembly for a grill.

A further object is the provision of grill with a weighted pivotally supported upper heating plate assembly which readily adjusts to changes in the center of gravity due to different positions of the food charge on the lower plate.

A more specific object is the provision of a grill with a central adjustable counterweight in the upper heating plate assembly for compressing the food charge to uniform reduced thickness to insure rapid and even heating of the charge and to insure maximum firm contact between the food and the grill heating surfaces.

Other objects of the invention will become apparent from the following description of a preferred embodiment thereof reference being had to the accompanying drawing in which.

Figure 1:
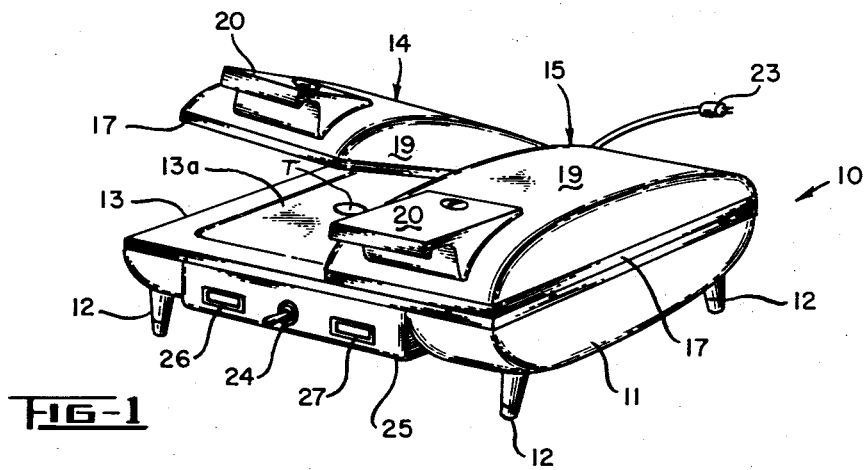
FIGURE 1 is a perspective view of a dual grill of the type embodying the invention and showing one of the upper plate assemblies in the open position and the other in the closed position.

Referring now to the drawings, an embodiment of the invention is shown in FIGURE 1 as a dual unit grill 10 comprising a base 11 supported on legs 12 and including two separate heating elements, not shown, each adapted to heat half of the lower heating plate 13 forming the top of the base. The central part of each half of the lower plate 13 has a shallow dished portion 13a which inclines slightly to the rear to facilitate cleaning of the heating surface.

Cooperating with the base and hinged thereto are a pair of substantially identical upper heater assemblies 14 and 15 which are aligned with the respective heating elements of the base. Since these upper assemblies 14 and 15 are constructed alike, it will be sufficient to describe the details of but one of them, like reference characters indicating like parts on the drawings. Each upper heater assembly has a heater plate 17 backed by a heater element 18, see FIGURES 2 and 4, and a cover member 19 which carries a forwardly projecting lift handle 20 for raising and lowering the assembly with respect to the base. Handle 20 preferably is made of heat insulating material and is connected directly to the heater plate 17 by a screw 21 which extends through the cover member and engages a tapped hole in a post 22 formed integrally with plate 17. The heater elements in the base 11 and in both upper assemblies are energized through a power cable 23 connected at the rear of the base and are turned on and off by a toggle switch 24 on a front panel 25. Indicator lamps 26 and 27 on this panel indicate operation of the two grill units.

Figure 2:
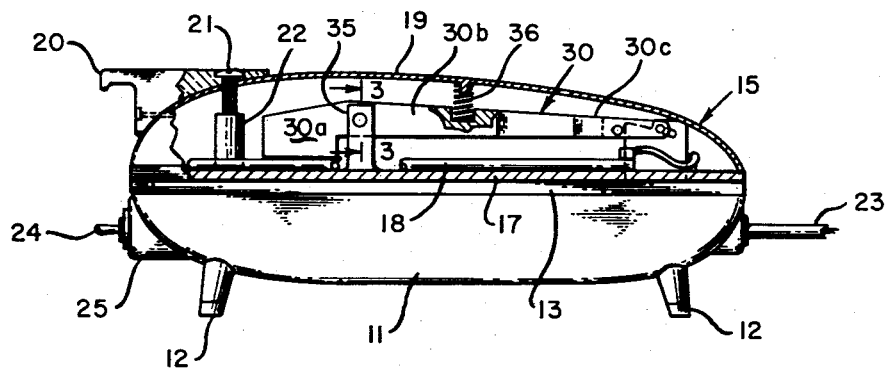
FIGURE 2 is an enlarged side elevation of the grill with the major part of the upper plate assembly broken away to show details of construction.

Each upper assembly is pivotally connected at the rear, to the right as viewed in FIGURES 2 and 4, to the base by a hinge assembly, described in detail below, so that a food charge to be grilled may be placed between the heating plates when separated as shown at the left in FIGURE 1, and may be heated by contact with both plates when closed as shown at the right in the figure. Proper and efficient grilling requires that the heating plates bear against opposite sides of the food parcel with suitable pressure to insure maximum contact with the heating surfaces. Furthermore, if the grill includes a thermostatic control with an element T flush-mounted with each half of heater plate 13, see FIGURE 1, suitable pressure on the food charge is required to insure that it makes full and firm contact with the top surface of that element. Such a thermostatic control is fully described in the copending application of Burton E. Shaw and Roger K. Lee, Jr., entitled "Cooking Apparatus," Serial No. 851,797, now Patent No. 2,985,094, issued May 23, 1961, assigned to the assignee of this application.

To provide pressure of this kind as well as to incorporate a rigid structural member for hinging the upper heating plate 17 on the base, an elongated longitudinally extending hinge arm 30, preferably made of cast iron, is mounted above plate 17 symmetrically of its central axis A—A. Arm 30 has an enlarged forward section 30a, a central section 30b of reduced width, and a rear bifurcated or hinge section 30c.

Figure 3:
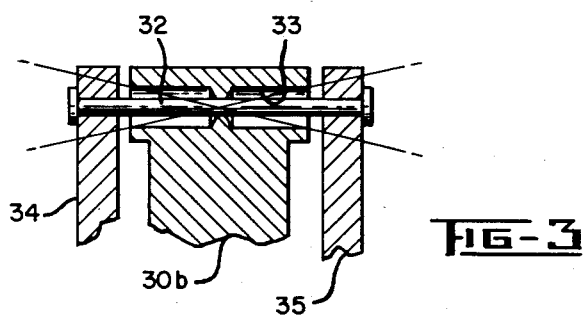
FIGURE 3 is a transverse section of the forward pivotal connection of heating plate and hinge arm taken on line 3—3 of FIGURE 2.

Heating plate 17 is loosely pivotally connected to the central arm section 30b by pin 32, see FIGURE 3, which extends through an oversize hole 33 in the section and through openings in upright lugs 34 and 35 formed integrally with the heating plate. The play of pin 32 in opening 33 permits lateral floating of the heating plate to permit maximum plate contact with the food charge in the lateral plane. A loading spring 36 between cover 19 and the hinge arm compensates for changes in the center of gravity of upper heating plate due to different locations of the food charge on the base heating plate and so maintains optimum contact between the food and the plate at all times.

The function of hinge arm 30, and especially the weighted forward part 30a thereof, as a counterweight is important in the operation of the grill. The downward force applied by this weighted arm through the heating plate to the food parcel to be heated causes the food to be packed evenly and to a somewhat uniform density so as to be heated rapidly and evenly. The weight is distributed centrally of the grill heating surfaces and causes these surfaces to be pressed against a larger area of the food as the compressing action. If the charge is frozen, the combination of pressure and heat operates more rapidly to thaw it, thus hastening the entire operation.

Figure 4:
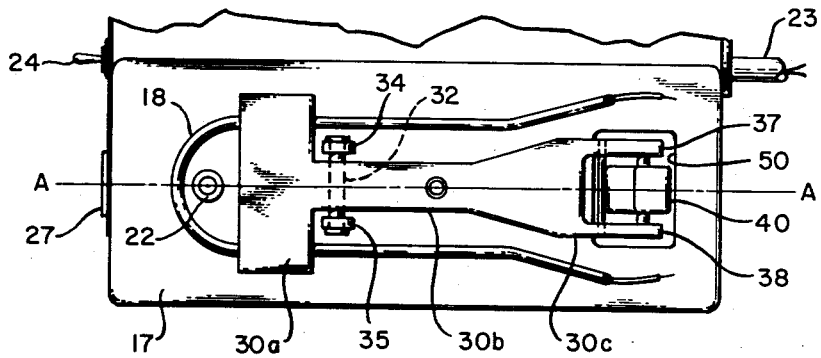
FIGURE 4 is a plan view of one-half of the dual grill unit with the cover removed.
Figure 5:
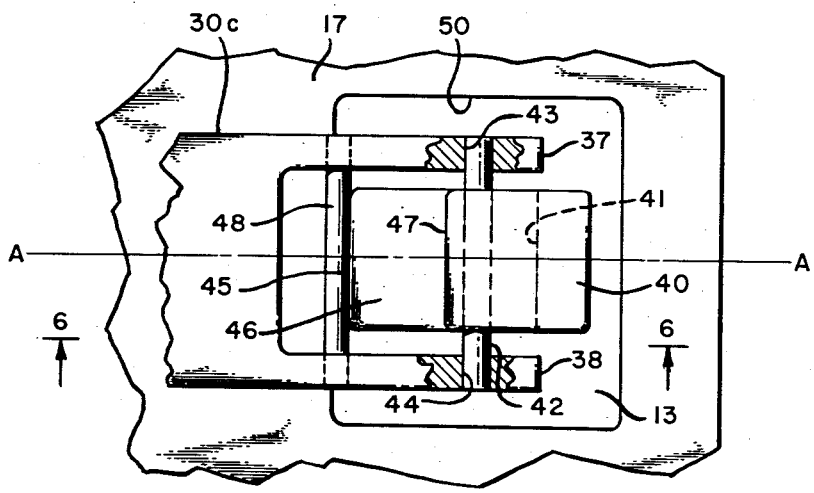
FIGURE 5 is an enlarged view of part of FIGURE 4 showing the hinge and lock assembly.
Figure 6:
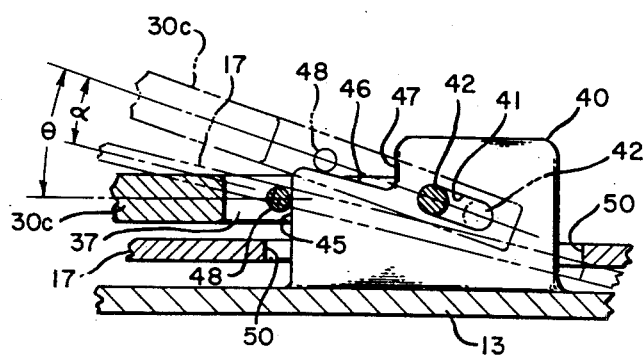
FIGURE 6 is a section taken on line 6—6 of FIGURE 4.

The rear or hinge section 30c of the hinge arm has two laterally spaced extensions 37 and 38, see FIGURES 4 and 5, between which a hub 40 projects up from connection to the lower heating plate 13. Hub 40 preferably is integral with plate 13 and has transverse diagonally elongated opening 41 adapted to receive rear hinge pin 42, the outer ends of which engage in openings 43 and 44 in extensions 37 and 38. Hub 40 has a front face 45 oriented perpendicularly to the plane of lower heating plate 13 and which merges with top surface 46 having a gently downwardly and rearwardly sloping contour terminating at shoulder 47. A transverse positioning pin 48 journalled at its ends in extensions 37 and 38 is arranged to engage face 45 when the grill is closed and to ride up, over and backward onto surface 46 as the upper heater assembly is pivoted to the opened position, the latter being positively locked open as long as pin 48 is in the position shown in broken line in FIGURE 6. The elongated shape of opening 41 accommodates the rearward shift of pin 42 that is necessary for rearward movement of the hinge arm so that the pin 42 is in the rear of the slot as indicated in broken line in FIGURE 6 when position pin 48 securely engages locking surface 46.

Upper heating plate 17 is formed with a rear opening 50 to accommodate upward projection of hub 40 therethrough projects and to permit pivotal movements of the upper assembly without interference between plate 17 and the hub. It should be noted that upper heating plate 17 together with the cover 19 are only loosely connected to hinge arm 30 by pivot pin 32 and spring 36 and therefore plate 17 is disposed at a slight angle α to the arm 30 when the grill is open, as indicated in broken line in FIGURE 6, due to the pressure of spring 36 against cover 19.

The steps of opening and closing each upper assembly of the grill has been greatly simplified by the above-described construction. The operator needs but one hand to lift the upper heater assembly preparatory to inserting a food charge between heating plates. When the upper assembly 17 has been pivoted up until position pin 48 rides to the top of front hub face 45, additional upward pivoting coupled with rearward movement of the assembly causes pin 48 to ride back onto surface 46 as pivot pin 42 slides to the rear of pivot opening 41. The total rearward movement may be as little as ½" and yet the entire upper assembly is securely locked in the open position. Closing of the upper assembly follows the reverse of these steps and likewise is accomplished with speed and convenience. The angle θ which hinge arm 30 makes with horizontal when it is open is set by the height of hub surface 46 above diagonal pivot opening 41 and we have found that an angle of θ of 45 degrees is sufficient to give ready access to the grill surfaces.

Changes in and modifications to the above described embodiment of our invention may be made by those skilled in the art without departing from the precepts of the invention. It is intended, therefore, that the appended claims shall define the scope of the invention.

We claim:

1. An electric grill comprising a base having a heating plate with a hinge hub projecting upwardly therefrom near one end thereof, said hub having a transverse elongated opening and an upper inclined surface spaced from the plate above said opening, a movable heater assembly comprising a heating plate adapted to be superimposed on the base heating plate, said movable assembly also having an elongated longitudinally extending hinge arm having a central transverse opening and a pair of extensions disposed on opposite sides of said hub, a hinge pin extending through said opening on the hub and secured to said hinge arm extensions, said movable heating plate having a pair of laterally spaced posts extending upwardly therefrom remote from said hub and on opposite sides of said hinge arm adjacent to said central opening, a forward pivot pin having a diameter less than the diameter of the central opening extending through said central opening and engaging said posts whereby the movable heating plate has limited movement relative to said hinge arm, and position pin means extending between said hinge extensions and releasably engageable with said inclined surface of the hub when the hinge arm is pivoted up from the base for locking the upper assembly in the open position.

2. An electric grill comprising a stationary heating plate and a movable heating plate adapted to be moved into juxtaposition above the stationary plate for heating a food charge disposed therebetween, and means for pivotally supporting said movable plate on said stationary plate comprising a hub fixed on and projecting up from the stationary plate, said movable plate having an opening therein through which said hub is adapted to extend, said hub having a transverse longitudinally elongated opening therethrough and front and upper surfaces, said upper surface being spaced above said transverse opening by a predetermined distance, a longitudinally extending weighted hinge arm spaced above and along the central axis of said movable heating plate, said arm having laterally spaced extensions at one end adapted to extend adjacent to opposite sides of said hub, a hinge pin extending through said transverse opening in said hub and secured at the ends thereof to said extensions, a position pin secured to and extending between said extensions and adapted to engage said front face of the hub when the heating plates are juxtaposed and to engage said upper surface when said plates are in the open locked position; and means for connecting said movable heating plate and said hinge arm at a point remote from said hub.

3. The grill according to claim 2 in which said upper surface of the hub is inclined downwardly and away from said front face, said transverse opening in the hub also being elongated in a downward and rearward direction.

4. The grill according to claim 2 in which said movable heating plate and said hinge arm are loosely interconnected at a point remote from said hub.

5. The grill according to claim 4 having a cover member entirely enclosing the hinge arm and the hub and the top of the movable heating plate, said cover being removably secured to said movable plate, and handle means secured to the cover.

6. The grill according to claim 5 with a compression spring disposed between the top of said hinge arm and the said cover member and located intermediate the hub and point of loose interconnection of the hinge arm and movable plate.

References Cited in the file of this patent

UNITED STATES PATENTS

| 1,661,294 | Lemaster | Mar. 6, 1928 |
| 1,918,051 | McArdle | July 11, 1933 |
| 2,146,172 | Burch | Feb. 7, 1939 |
| 2,936,697 | Kueser | May 17, 1960 |